United States Patent
Lugg et al.

(10) Patent No.: US 8,226,737 B2
(45) Date of Patent: Jul. 24, 2012

(54) FIXED ABRASIVE PARTICLES AND ARTICLES MADE THEREFROM

(75) Inventors: Paul S. Lugg, Woodbury, MN (US); Joel D. Oxman, Minneapolis, MN (US); Bruce A. Sventek, St. Paul, MN (US); Blake R. Dronen, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 532 days.

(21) Appl. No.: 12/492,464

(22) Filed: Jun. 26, 2009

(65) Prior Publication Data

US 2010/0000160 A1    Jan. 7, 2010

Related U.S. Application Data

(60) Provisional application No. 61/077,929, filed on Jul. 3, 2008.

(51) Int. Cl.
- *B24D 3/02* (2006.01)
- *B24D 3/06* (2006.01)
- *B24D 3/10* (2006.01)
- *B24D 3/28* (2006.01)
- *B24D 11/02* (2006.01)
- *B24D 99/00* (2010.01)

(52) U.S. Cl. ............................... 51/309; 51/298; 51/307
(58) Field of Classification Search ........................ None
See application file for complete search history.

(56) References Cited

U.S. PATENT DOCUMENTS

| | | |
|---|---|---|
| 2,332,505 A | 10/1943 | Crompton, Jr. |
| 3,018,262 A | 1/1962 | Schroeder |
| 3,041,156 A | 6/1962 | Rowse et al. |
| 3,117,099 A | 1/1964 | Proops et al. |
| 3,446,616 A | 5/1969 | Clark |
| 4,311,489 A | 1/1982 | Kressner |
| 4,314,827 A | 2/1982 | Leitheiser et al. |
| 4,349,456 A | 9/1982 | Sowman |
| 4,472,480 A | 9/1984 | Olson |
| 4,567,073 A | 1/1986 | Larson et al. |
| 4,614,667 A | 9/1986 | Larson et al. |
| 4,623,364 A | 11/1986 | Cottringer et al. |
| 4,642,126 A | 2/1987 | Zador et al. |
| 4,652,274 A | 3/1987 | Boettcher et al. |

(Continued)

FOREIGN PATENT DOCUMENTS

EP    0 412 430    2/1991

(Continued)

OTHER PUBLICATIONS

DeGroote et al., "Quantitative Characterization of Optical Polishing Pitch", in Optical Manufacturing and Texting IV, vol. 4451, edited by H. P. Stahl (SPIE, Bellingham, WA, 2001), pp. 209-221.

(Continued)

*Primary Examiner* — Roy King
*Assistant Examiner* — Jared Wood
(74) *Attorney, Agent, or Firm* — Yen Tong Florczak (57) ABSTRACT

An abrasive particle includes a substantially spheroid metal containing matrix having a circumference and a super abrasive material having an average diameter of less than about 8 micrometer at least partially embedded the circumference of the metal containing matrix. The abrasive particle having an average diameter of less than about 200 micrometer.

20 Claims, 5 Drawing Sheets

U.S. PATENT DOCUMENTS

| | | | |
|---|---|---|---|
| 4,652,275 A | 3/1987 | Bloecher et al. | |
| 4,735,632 A | 4/1988 | Oxman et al. | |
| 4,744,802 A | 5/1988 | Schwabel | |
| 4,770,671 A | 9/1988 | Monroe et al. | |
| 4,799,939 A | 1/1989 | Bloecher et al. | |
| 4,828,583 A | 5/1989 | Oxman et al. | |
| 4,881,951 A | 11/1989 | Wood et al. | |
| 4,903,440 A | 2/1990 | Larson et al. | |
| 4,930,266 A | 6/1990 | Calhoun et al. | |
| 4,997,461 A | 3/1991 | Markhoff-Matheny et al. | |
| 5,009,675 A | 4/1991 | Kunz et al. | |
| 5,011,508 A | 4/1991 | Wald et al. | |
| 5,042,991 A | 8/1991 | Kunz et al. | |
| 5,085,671 A | 2/1992 | Martin et al. | |
| 5,201,916 A | 4/1993 | Berg et al. | |
| 5,213,591 A | 5/1993 | Celikkaya et al. | |
| 5,236,472 A | 8/1993 | Kirk et al. | |
| 5,314,513 A | 5/1994 | Miller et al. | |
| 5,318,604 A | 6/1994 | Gorsuch et al. | |
| 5,356,947 A | 10/1994 | Ali et al. | |
| 5,368,618 A | 11/1994 | Masmar et al. | |
| 5,500,273 A | 3/1996 | Holmes et al. | |
| 5,545,676 A | 8/1996 | Palazzotto et al. | |
| 5,580,647 A | 12/1996 | Larson et al. | |
| 5,620,775 A | 4/1997 | LaPerre | |
| 5,645,471 A | 7/1997 | Strecker | |
| 5,672,097 A | 9/1997 | Hoopman | |
| 5,692,950 A * | 12/1997 | Rutherford et al. | 451/552 |
| 5,786,430 A | 7/1998 | Kaplan et al. | |
| 5,872,192 A | 2/1999 | Kaplan et al. | |
| 5,998,495 A | 12/1999 | Oxman et al. | |
| 6,025,406 A | 2/2000 | Oxman et al. | |
| 6,043,295 A | 3/2000 | Oxman et al. | |
| 6,102,786 A | 8/2000 | Hirose et al. | |
| 6,187,833 B1 | 2/2001 | Oxman et al. | |
| 6,187,836 B1 | 2/2001 | Oxman et al. | |
| 6,228,133 B1 | 5/2001 | Thurber et al. | |
| 6,245,828 B1 | 6/2001 | Weinmann et al. | |
| 6,319,108 B1 | 11/2001 | Adefris et al. | |
| 6,372,336 B1 | 4/2002 | Clausen et al. | |
| 6,395,124 B1 | 5/2002 | Oxman et al. | |
| 6,645,624 B2 | 11/2003 | Adefris et al. | |
| 6,752,700 B2 | 6/2004 | Duescher | |
| 6,765,036 B2 | 7/2004 | Dede et al. | |
| 6,779,656 B2 | 8/2004 | Klettke et al. | |
| 6,964,999 B1 * | 11/2005 | Nakagawa et al. | 525/193 |
| 7,044,835 B2 | 5/2006 | Mujumdar et al. | |
| 7,169,031 B1 | 1/2007 | Fletcher et al. | |
| 7,262,228 B2 | 8/2007 | Oxman et al. | |
| 7,410,410 B2 | 8/2008 | Mahadev et al. | |
| 7,410,413 B2 | 8/2008 | Woo et al. | |
| 2002/0068518 A1 | 6/2002 | Cesena et al. | |
| 2003/0064663 A1 * | 4/2003 | Muilenburg et al. | 451/6 |
| 2005/0118352 A1 | 6/2005 | Suwa | |
| 2005/0118939 A1 * | 6/2005 | Duescher | 451/527 |
| 2006/0156634 A1 | 7/2006 | Welygan et al. | |
| 2007/0093181 A1 * | 4/2007 | Lugg et al. | 451/41 |
| 2009/0047480 A1 | 2/2009 | Juers et al. | |
| 2009/0258581 A1 | 10/2009 | Hamill | |
| 2010/0000160 A1 | 1/2010 | Lugg et al. | |

FOREIGN PATENT DOCUMENTS

| | | |
|---|---|---|
| EP | 0 331 344 B1 | 9/1993 |
| EP | 0 744 248 A1 | 11/1996 |
| EP | 0 999 918 B1 | 12/2002 |
| EP | 1 361 021 B1 | 11/2003 |
| JP | 51-33541 | 9/1976 |
| WO | WO 94/27833 | 12/1994 |
| WO | WO 01/51540 | 7/2001 |
| WO | WO 2009/046296 A1 | 4/2009 |
| WO | WO 2010/002725 A2 | 1/2010 |

OTHER PUBLICATIONS

DeGroote et al., "A Data Base for the Physical Properties of Optical Polishing Pitch", in Optical Fabrication and Testing Digest (Optical Society of America, Washington, DC, 2002), pp. 55-59.

DeGroote et al., "Experiments on Magnetorheological Finishing of Optical Polymers", in Optical Fabrication and Testing Digest (Optical Society of America, Washington, DC, 2002), pp. 6-9.

Varshneya et al., "Characterizing optical polishing pitch", Optifab 2003, (SPIE, Bellingham, WA, 2003), vol. TD02, pp. 87-89.

Jiang et al., "On the advanced lapping process in the precision finishing of thin-film magnetic recording heads for rigid disc drives", *Appl. Phys. A*, 77, 923-932 (2003).

3M Technical Data, "Secondary Liners", Dec. 2007.

ASTM D3330/D3330M-04, "Standard Test Method for Peel Adhesion of Pressure-Sensitive Tape", Apr. 2010, pp. 1-6.

* cited by examiner

FIXED ABRASIVE PARTICLES AND ARTICLES MADE THEREFROM

CROSS REFERENCE TO RELATED APPLICATION

This application claims the benefit of U.S. Provisional Patent Application No. 61/077,929, filed Jul. 3, 2008, the disclosure of which is incorporated by reference herein in its entirety.

BACKGROUND

A current industry practice today for polishing or finishing an article (sometimes referred to in the industry as a "work piece") involves using a metal lapping plate with abrasive slurry, such as diamond slurry, in a polishing process. One potential drawback of the use of slurry filled metal plates is that the surface of the plate eventually becomes saturated with the abrasive slurry and thus can no longer finish or polish the work-piece. When saturation occurs, a common practice for the users is to resurface, typically by grinding down, the metal lapping plate. This refinishing process is laborious, because the plates are heavy and cumbersome, time consuming, and generate waste containing metal shards in a liquid suspension. The grinding refinish step is also a destructive process because during each re-grind, a portion of the metal lapping plate is removed.

In another industry practice, a fixed abrasive material can be used to polish or finish a work piece. A fixed abrasive material typically includes an abrasive layer, an adhesive, a backing and optionally other compliant materials. It is very desirable to have the fixed abrasive remain substantially flat during use. Unevenness in the fixed abrasive translates into uneven polishing, a non-desirable outcome. A fixed abrasive typically has an abrasive mineral (such as diamond), a resin used to attach the mineral to a backing, and an adhesive to attach the abrasive mineral backing to a substrate. The adhesive is typically a pressure sensitive adhesive. These fixed abrasives can be used to polish alumina-titanium-carbon (Al-TiC) rowbars. The polishing steps occur at pressures of about 10 to 20 pounds per square inch (psi) and up to as high as 60 psi. If there is unevenness, asperities, and/or waviness in the fixed abrasive, use of such a fixed abrasive will likely lead to crowning of the work piece. Crowning is undesirable rounding or rolled-off thereby of the work piece.

SUMMARY

The present disclosure addresses the problems stated above by providing for durable metal based abrasive composite particles. The particles can be used to form a fixed abrasive article that is substantially flat. Because of the controlled flatness of the fixed abrasive articles, the various embodiments in this disclosure finds application in finishing and polishing applications, such as, e.g., semiconductor finishing of integrated circuit (IC) chips or row bars used for hard disk drives.

The present disclosure provides metal based abrasive particles that use very small super-abrasive materials, having an average diameter of less than about 8 micrometer. In an embodiment, the super-abrasive materials have an average diameter of less than about 0.5 micrometer. In another embodiment, the super-abrasive material has an average diameter of about 0.2 to 0.3 micrometer. At these dimensions, the super-abrasive material is in powder form. To form abrasive particles from such fine material presents processing challenges as well as handling challenges. In this disclosure, the inventors have discovered a way to produce abrasive particles and fixed abrasive articles made from the particles despite these challenges. Furthermore, the fixed abrasive articles do not need to need to go through the laborious reworking process that is presently used by some in the hard disk drive finishing industry The metal based abrasive particles disclosed herein can also be used in a slurry type application. That is, the abrasive particles are dispersed in a solution to form abrasive slurry for use with, e.g., a metal lapping plates, compliant pads, or tumbler systems such as those used in gem polishing or optical lens polishing.

The present disclosure also describes a useful, cost effective, and manufacturable process for attaching the metal based abrasive article to a rigid substrate, such as a platen, through the use of a photopolymerizable adhesive. Advantageously, the photopolymerizable adhesive is cured using a visible light source, which is more readily available in the industry as is generally seen as less hazardous, as compared to, e.g., ultraviolet light source. In one embodiment, the photopolymerizable adhesive is a B-stageable adhesive.

In one aspect, the present disclosure pertains to a metal based abrasive particle comprising a substantially spheroid metal containing matrix having a circumference and a super abrasive material having an average diameter of less than about 8 micrometer at least partially embedded in the circumference of the metal containing matrix. Each abrasive particle has an average diameter of less than about 200 micrometer. In one embodiment, the abrasive particle has an average diameter of less than about 100 micrometer. In another embodiment, the abrasive particle has an average diameter of about 25 to 35 micrometer.

In another aspect, the present disclosure pertains to a fixed abrasive article comprising: (a) a backing having opposing first and second surfaces, (b) an adhesive disposed on the first surface of the backing, and (c) a plurality of abrasive particles disposed on the adhesive, each abrasive particle comprising a substantially spheroid metal containing matrix having a circumference and a super abrasive material having an average diameter of less than about 8 micrometer at least partially embedded in the circumference of the metal containing matrix, wherein the abrasive particle having an average diameter of less than about 200 micrometer.

In yet another aspect, the present disclosure pertains to a method of making a fixed abrasive article comprising the steps of: (a) providing a backing having opposing first and second surfaces; (b) applying an adhesive to the first surface of the substrate; and (c) depositing a plurality of abrasive particles disposed on the adhesive coated first surface of the backing, each abrasive particle plurality comprising a substantially spheroid metal containing matrix having a circumference and a super abrasive material having an average diameter of less than about 8 micrometer at least partially embedded in the circumference of the metal containing matrix, wherein the abrasive particle having an average diameter of less than about 200 micrometer. The abrasive article can be attached to a rigid substrate with the additional steps of (d) providing a substantially flat first rigid substrate having opposing first and second surface; (e) applying a photopolymerizable adhesive on the first surface of the rigid substrate; (f) contacting the second surface of the backing containing the fixed abrasive particles to the first surface of the rigid substrate containing the photopolymerizable adhesive to form a stack; (g) covering the fixed abrasive particles with a substantially flat second rigid substrate forcing the photopolymerizable adhesive to move into alignment thereby compensating for thickness variance within the abrasive article; and (h) exposing the stack to visible light to vitrify the photopolymerizable adhesive yielding a vitrified adhesive that bonds the backing of the fixed abrasive article to the first rigid substrate.

As used herein:

a "B-stageable adhesive" means generally that the adhesive is sufficiently thick (or viscous) upon dispensing so as to reduce slumping, which is a phenomena where the adhesive flows beyond the original application site;

a "ductile" metal or metal alloy is one that is capable of being drawn out or hammered thin;

a "fixed abrasive article" means generally that the metal abrasive particles are attached to a substrate;

a "metal-containing matrix" means generally a metal or metal alloy in which the super-abrasives are attached, embedded, or both; and a "vitrified adhesive" means generally that the adhesive has been converted into a glassy one by using a light source, preferably a visible light source.

BRIEF DESCRIPTION OF THE DRAWINGS

This disclosure can be better described with reference to the drawings, wherein.

The figures are idealized, are not drawn to scale, and are intended merely for illustrative purposes.

DETAILED DESCRIPTION

All numbers used herein are assumed to be modified by the term "about". The recitation of numerical ranges by endpoints includes all numbers subsumed within that range (e.g., 1 to 5 includes 1, 1.5, 2, 2.75, 3, 3.80, 4 and 5). All parts recited herein are by weight, unless otherwise indicated. All molecular weights are weight average molecular weights.

Figure 1A:
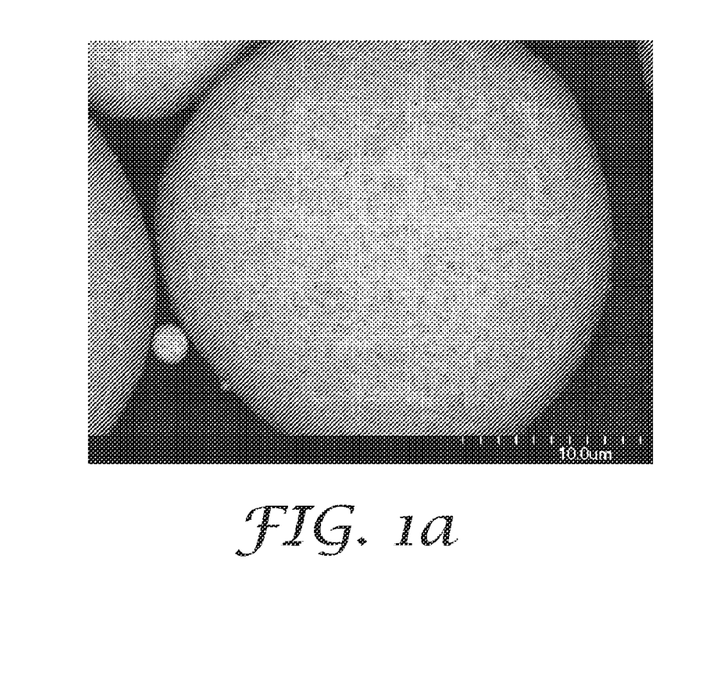
FIGS. 1a and 1b are scanning electron microscope (SEM) images at a magnification of 4,000× of, respectively, (i) a metal alloy particle having an exposed surface and (ii) an abrasive particle containing super-abrasive material at least partially embedded in the exposed surface of the metal alloy bead.
Figure 1B:
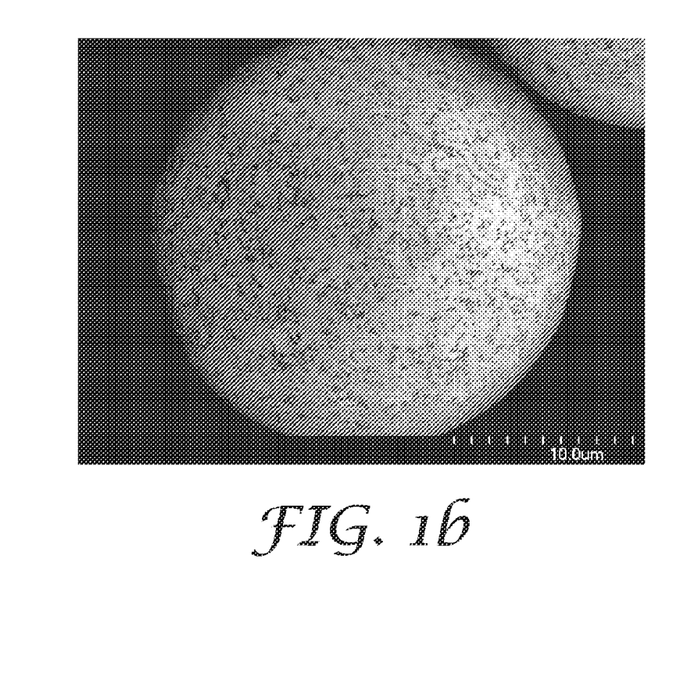

FIG. 1a shows a SEM micrograph of a metal alloy bead, in this case of tin-bismuth. FIG. 1b shows a SEM micrograph of an abrasive particle having a tin-bismuth metal alloy matrix containing a plurality of super-abrasive materials of polycrystalline diamond, shown as black dots.

Figure 2A:
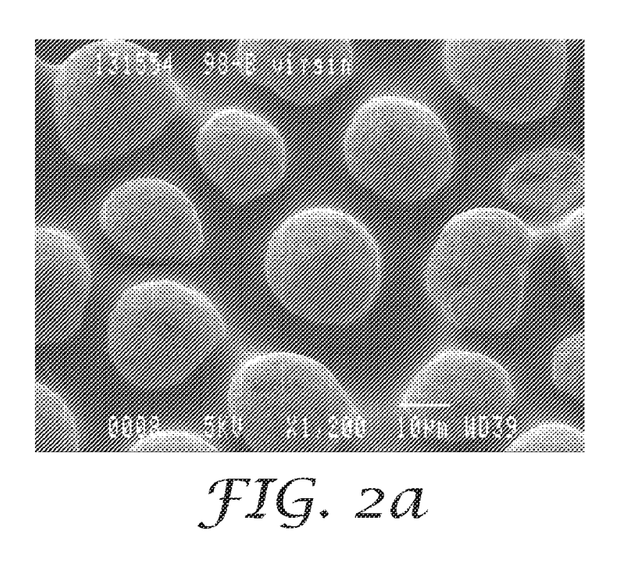
FIGS. 2a and 2b are SEM images at a magnification of 1,200× of, respectively, an abrasive article before and after it has been used for polishing.
Figure 2B:
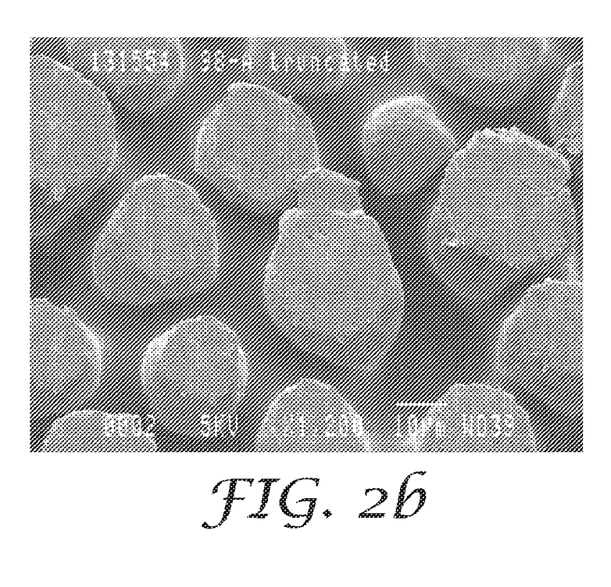

FIG. 2a shows a SEM micrograph of a fixed abrasive article where there a plurality of abrasive particles have been attached to a backing. As can be seen, the particles attached to the backing are substantially spherical with a dome like portion protruding from the attaching resin (also referred to as adhesive). FIG. 2b shows a SEM micrograph of a fixed abrasive article after it has been used to polish a work piece. It is believed that during use, due to the grinding action, the top portion of the dome like protrusion changes from a circular profile to a planar profile. The domes like protrusions appear visually as being partially truncated. The polycrystalline diamonds that were originally on the circumference of the dome like protrusion are now on the planar region of the truncated dome. In this geometry, the polycrystalline diamonds are particularly useful as an abrasive material for polishing a work piece. Furthermore, both figures show the particles being packed on a surface of the backing such that there are gaps in between the particles in a substantially monolayer arrangement. As can be seen, in these figures, there are gaps between the particles, thereby allowing the irradiated visible light to pass through the particle layer, as further explained with reference to FIGS. 4 and 5.

Figure 3:
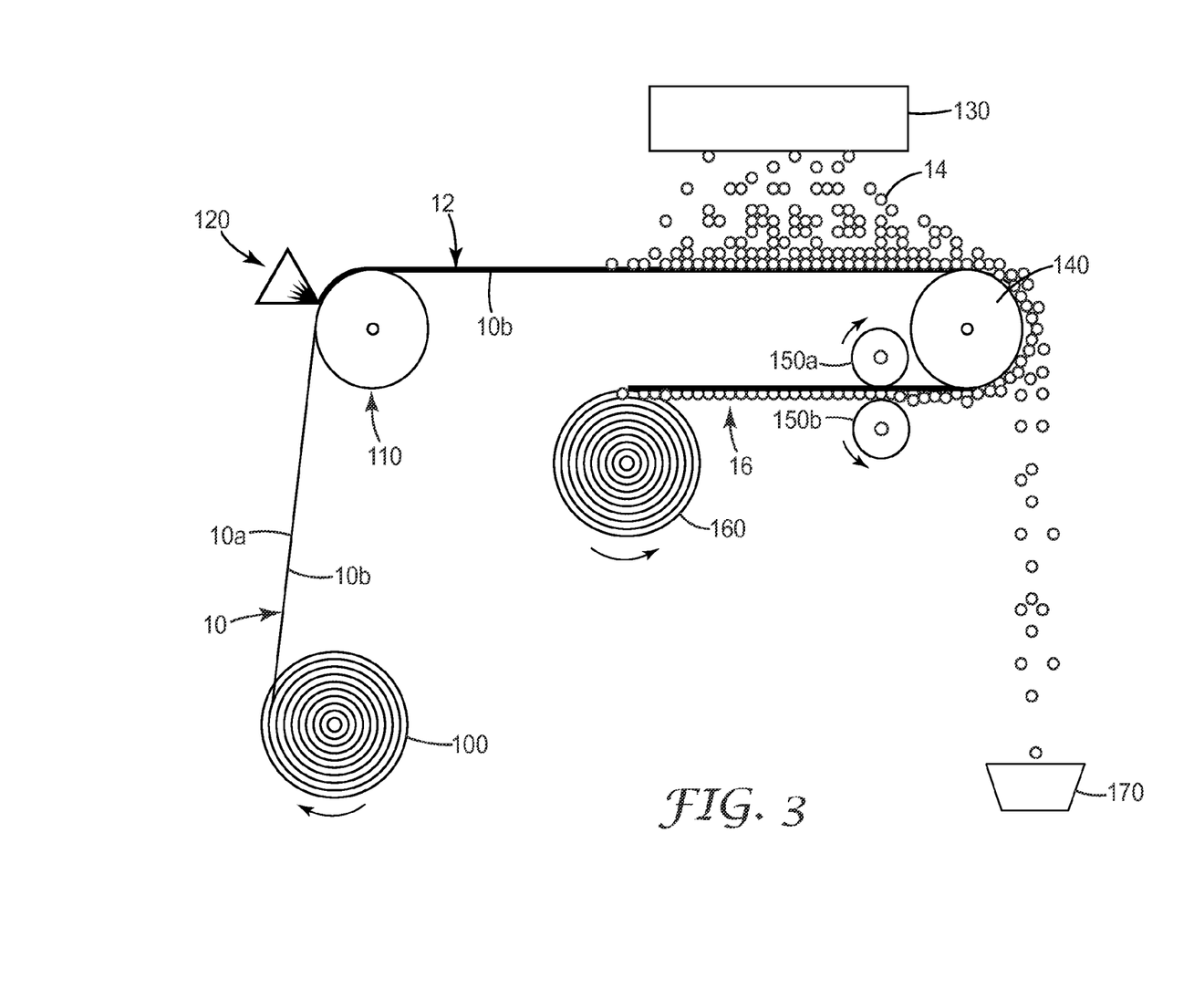
FIG. 3 is a schematic view of an exemplary process for making an abrasive article according to the present disclosure.

FIG. 3 shows a schematic view of an exemplary process that can be used to make a fixed abrasive article using the abrasive particles described herein. From an unwind roll 100, a backing 10 having opposing first 10a and second 10b surfaces is unwound and led towards roller 110 where an adhesive coating station 120 applies an adhesive 12 to the first surface 10a of the backing 10. The adhesive coated backing, with the tacky adhesive, is passed under a hopper 130 where a plurality of abrasive particles 14 is dropped. The abrasive particles adhere to the adhesive coated backing forming a fixed abrasive article 16. The web is then passed over roller 140 where excess abrasive particles that did not adhere to the substrate backing are allowed to fall off and collected in a receptacle 170 for reuse. The abrasive particle laden web is then passed through a pair of nip rollers 150a and 150b where the particles are forced into substantially a mono-layer arrangement on the adhesive coated first surface of the substrate. This web is then wound up in product roll 160 of fixed abrasive article.

Figure 4:
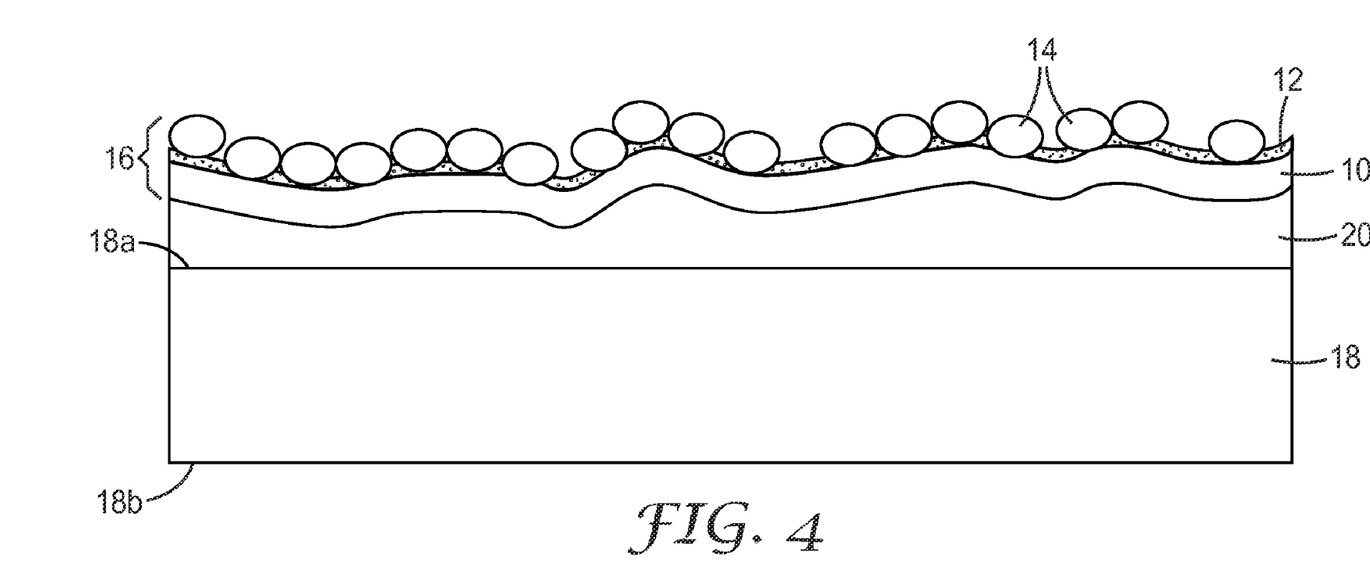
FIG. 4 is a schematic cross-section view of attaching the abrasive article of FIG. 3 to a rigid substrate.

FIG. 4 shows a schematic cross-sectional view of view of partially attaching the abrasive article of FIG. 3 to a rigid substrate, such as a platen. The abrasive article 16 contains abrasive particles 14 attached to a backing 10 using an adhesive 12. While the backing and the particles are represented as being substantially uniform in thickness and diameter, they may have thickness variances from side to side or in the middle. On to a first surface 18a of a first rigid substrate 18, one can dispense a photopolymerizable adhesive 20. This figure shows that the adhesive 20 may not have uniform thickness.

Figure 5:
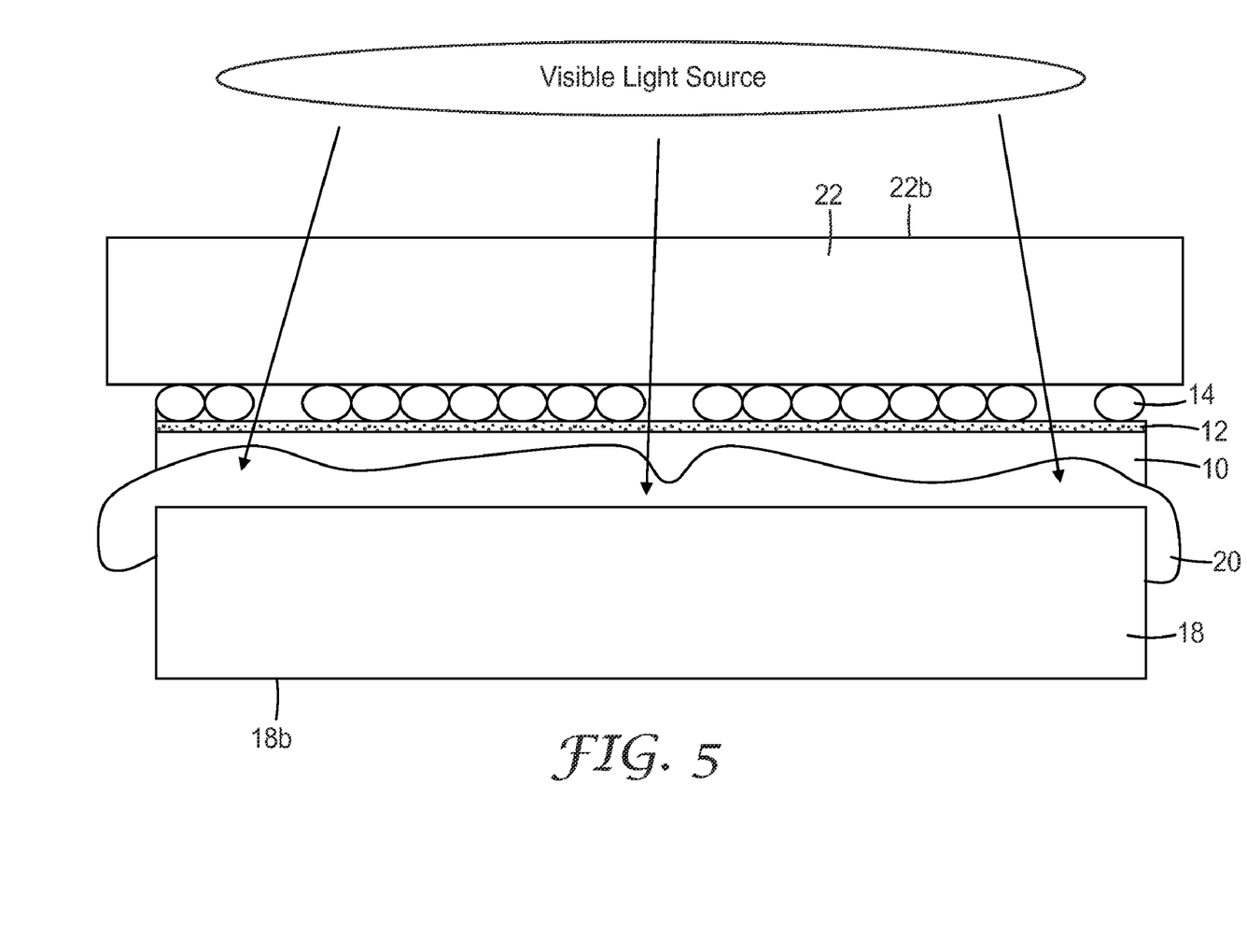
FIG. 5 is schematic cross-sectional view of curing the article of FIG. 4 to a rigid substrate.

FIG. 5 shows a schematic cross-sectional view of the abrasive article of FIG. 4 that has been sandwiched between the first rigid substrate 18 and a second rigid substrate 22 to form a stack. The flatness of the first and second rigid substrates, 18 and 20, can impact the flatness of the fixed abrasive particle. Thus, it is beneficial to have first and second rigid substrates whose surface is very flat but also uniform in thickness. At least one of the first and second rigid substrate is transparent so as to allow visible light to pass through to photopolymerize the adhesive 20 thereby vitrifying it. In this FIG. 5, a visible light source 170 is exposed on the particle side of the stack. Because there are open spaces or gaps between the abrasive particles, the some of the irradiated visible light passes through to the photopolymerizable adhesive layer. It is within the scope of the present disclosure to photopolymerize the adhesive 20 through the first rigid substrate, such as passing through surface 18a, so long as the first rigid substrate transmits a portion of the irradiated visible light. After the adhesive 20 has polymerized or vitrified so as to form an adhesive bond between the first rigid substrate and the fixed abrasive article, the combination can be mounted on to a polishing tool for use in polishing or finishing a work piece.

While FIGS. 1 to 5 show the metal based abrasive particles disposed on a first side of a backing, it is within the scope of this disclosure to have the abrasive particles disposed on an opposing second side of the backing. Furthermore, the abrasive particles can be disposed on a first or a second or both sides of a rigid substrate.

In another application, the metal based abrasive particles are disposed on a surface of a rigid substrate, such as a metal platen, with more than a monolayer of the particles. In this case, the abrasive particles are loaded onto a first surface of the platen such that particles will stack on top of one another. The abrasive particles can be disposed on and attached to a surface of the platen using, e.g., a room temperature cure epoxy resin system. Multiple layers of abrasive particles can be attached to the platen surface.

In one aspect, the abrasive particles can be made by charging into a vessel, metal-containing matrix (predominantly spheroids), super-abrasive particles, and grinding media. The vessel is then milled for a period of time, typically at room temperature. It is believed that the milling process forces the super abrasive material to penetrate into, attach to, and protrude from the metal containing matrix. The circumference of the metal containing matrix changes from pure metal or metal alloy to a composite of super abrasive and metal or metal alloy. The subsurface of the metal containing matrix near the circumference also contains the super abrasive material, which would be considered as being embedded in the metal containing matrix. It is believed that the subsurface super abrasive materials provide localized stiffness to the super abrasive material that protrudes from the circumference thereby enhancing the performance of the abrasive particle. By enhancing performance, it is generally meant that the abrasive particle has a longer polishing life and higher removal rate of the material of the work piece. The exposed super abrasive material provides the grinding, polishing, or finishing of the work piece. After the milling process, typically, one would pass the mixture through a separator, such as a sieve, where the grinding media is segregated from the abrasive particles. Suitable materials for use as the metal-containing matrix include, but is not limited to, tin, tin alloys such as tin-bismuth alloy, and other ductile metals such as copper, indium, iron, and combinations thereof. Other ductile metals or metal alloys can be used. Suitable materials for use as the super-abrasive materials include, but are not limited to, diamond, polycrystalline diamond, cubic boron nitrides. Various combinations of the super-abrasive can be used.

Various materials can be used for the backing, including but not limited to polyester terephthalate, polyethylene naphthalate, polyimide, polycarbonate, and combinations thereof.

In the present disclosure, any photopolymerizable adhesive can be used, so long as it can be polymerized by visible light. In one embodiment, the a glass transition temperature ($T_g$) of the photopolymerizable adhesive, after polymerization with visible light, is greater than 20° C. During the process of mixing components for the adhesive, one needs to be careful not to expose the components of the adhesive to visible light. Suitable photopolymerizable adhesives include those disclosed in the following references: U.S. Pat. No. 4,735,632 "Coated Abrasive Binder Containing Ternary Photoinitiator System"; U.S. Pat. No. 4,828,583 "Coated Abrasive Binder Containing Ternary Photo-initiator System"; U.S. Pat. No. 5,545,676 "Ternary Photoinitiator System for Addition Polymerization"; U.S. Pat. No. 5,998,495 "Ternary Photoinitiator System for Curing Epoxy/Polyol Resin Compositions"; U.S. Pat. No. 6,025,406 "Ternary Photoinitiator System for Curing Epoxy Resins"; U.S. Pat. No. 6,043,295 (2000), "Ternary Photoinitiator System for Curing of Epoxy Resins"; U.S. Pat. No. 6,187,833 "Ternary Photoinitiator System for Curing Epoxy/Polyol Resin Compositions"; U.S. Pat. No. 6,187,836 "Compositions Featuring Cationically Active and Free Radically Active Functional Groups and Methods for Polymerizing Such Compositions"; U.S. Pat. No. 6,395,124 "Method of Producing a Laminated Structure"; U.S. Pat. No. 6,765,036 "Ternary Photoinitiator System for Cationically Polymerizable Resins"; and U.S. Pat. No. 7,262,228 "Photoinitiator Systems with Anthracene-Based Electron Donors for Curing Cationically Polymerizable Resins". These patents are incorporated by reference in and to the extent that they discuss photopolymerizable adhesives or compositions with photoinitiator systems that use visible light.

A particularly useful photopolymerizable adhesive for use in this disclosure is described in U.S. Pat. No. 7,262,228 that provides for a photopolymerizable composition that comprises a (i) cationically polymerizable resin and (ii) a photoinitiator system that includes an iodonium salt, a visible light sensitizer, and an electron donor compound, or a combination of electron donor compounds. The electron donor compound(s) are anthracene based.

Useful cationically polymerizable resins include, e.g., epoxy (including silicon-containing epoxy), oxetane, spiro-orthocarbonate, and, vinyl ether resins, as well as combinations thereof.

Useful epoxy resins are organic compounds having an oxirane ring, i.e., a group of the formula which is polymerizable by ring opening. Such materials, broadly called epoxides, include monomeric epoxy compounds and epoxides of the polymeric type and can be aliphatic, cycloaliphatic, aromatic or heterocyclic. These materials generally have, on the average, at least 1 polymerizable epoxy group per molecule, preferably at least about 1.5, and more preferably at least about 2 polymerizable epoxy groups per molecule. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds or may be mixtures of compounds containing one, two, or more epoxy groups per molecule. The "average" number of epoxy groups per molecule is determined by dividing the total number of epoxy groups in the epoxy resin by the total number of epoxy-containing molecules present.

These epoxy resins may vary from low molecular weight monomeric materials to high molecular weight polymers and may vary greatly in the nature of their backbone and substituent groups. For example, the backbone may be of any type and substituent groups thereon can be any group that does not substantially interfere with cationic polymerization at room temperature. Illustrative of permissible substituent groups are halogens, ester groups, ethers, sulfonate groups, siloxane groups, nitro groups, phosphate groups, and the like. The molecular weight of the epoxy resin may vary from about 58 to about 100,000 or more.

Particularly preferred epoxy resins include those which contain cyclohexene oxide groups such as epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. For a more detailed list of useful epoxides of this nature, reference is made to U.S. Pat. Nos. 3,117,099 and 6,245,828, International Patent Publication No. WO 01/51540, European Patent Publication No. 0 412 430, and Japanese Patent Publication No. 51-033541. Other useful epoxy resins include glycidyl ether monomers of the formula where R' is alkyl or aryl, and n is an integer of 1 to 6. Examples are glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol)propane). Further examples of epoxides of this type are described in U.S. Pat. No. 3,018,262, and in *Handbook of Epoxy Resins* by Lee and Neville, McGraw-Hill Book Co., New York (1967).

There is a host of commercially available epoxy resins that can be herein. In particular, epoxides that are readily available include octadecylene oxide, epichlorohydrin, styrene oxide, vinyl cyclohexene oxide, glycidol, glycidylmethacrylate, diglycidyl ether of Bisphenol A (e.g., those available under the trade designations "Epon 828", "Epon 825", "Epon 1004" and "Epon 1010" from Shell Chemical Co., "DER-331", "DER-332", and "DER-334", from Dow Chemical Co.), vinylcyclohexene dioxide (e.g., "ERL-4206" from Union Carbide Corp., a subsidiary of Dow Chemical Co.), 3,4-epoxycyclohexylmethyl-3,4-epoxycyclohexene carboxylate (e.g., "ERL-4221" or "CYRACURE UVR 6110" or UVR 6105" from Union Carbide Corp.), 3,4-epoxy-6-methylcyclohexylmethyl-3,4-epoxy-6-methyl-cyclohexene carboxylate (e.g., "ERL-4201" from Union Carbide Corp.), bis(3,4-epoxy-6-methylcyclohexylmethyl) adipate (e.g., "ERL-4289" from Union Carbide Corp.), bis(2,3-epoxycyclopentyl) ether (e.g., "ERL-0400" from Union Carbide Corp.), aliphatic epoxy modified from polypropylene glycol (e.g., "ERL-4050" and "ERL-4052" from Union Carbide Corp.), dipentene dioxide (e.g., "ERL-4269" from Union Carbide Corp.), epoxidized polybutadiene (e.g., "Oxiron 2001" from FMC Corp.), silicone resin containing epoxy functionality, flame retardant epoxy resins (e.g., "DER-580", a brominated bisphenol type epoxy resin available from Dow Chemical Co.), 1,4-butanediol diglycidyl ether of phenolformaldehyde novolak (e.g., "DEN-431" and "DEN-438" from Dow Chemical Co.), and resorcinol diglycidyl ether (e.g., "Kopoxite" from Koppers Company, Inc.), bis(3,4-epoxycyclohexyl)adipate (e.g., "ERL-4299" or "UVR-6128", from Union Carbide Corp.), 2-(3,4-epoxycyclohexyl-5,5-spiro-3,4-epoxy)cyclohexane-meta-dioxane (e.g., "ERL-4234" from Union Carbide Corp.), vinylcyclohexene monoxide 1,2-epoxyhexadecane (e.g., "UVR-6216" from Union Carbide Corp.), alkyl glycidyl ethers such as alkyl $C_8$-$C_{10}$ glycidyl ether (e.g., "HELOXY Modifier 7" from Shell Chemical Co.), alkyl $C_{12}$-$C_{14}$ glycidyl ether (e.g., "HELOXY Modifier 8" from Shell Chemical Co.), butyl glycidyl ether (e.g., "HELOXY Modifier 61" from Shell Chemical Co.), cresyl glycidyl ether (e.g., "HELOXY Modifier 62" from Shell Chemical Co.), p-tert-butylphenyl glycidyl ether (e.g., "HELOXY Modifier 65" from Shell Chemical Co.), polyfunctional glycidyl ethers such as diglycidyl ether of 1,4-butanediol (e.g., "HELOXY Modifier 67" from Shell Chemical Co.), diglycidyl ether of neopentyl glycol (e.g., "HELOXY Modifier 68" from Shell Chemical Co.), diglycidyl ether of cyclohexanedimethanol (e.g., "HELOXY Modifier 107" from Shell Chemical Co.), trimethylol ethane triglycidyl ether (e.g., "HELOXY Modifier 44" from Shell Chemical Co.), trimethylol propane triglycidyl ether (e.g., "HELOXY Modifier 48" from Shell Chemical Co.), polyglycidyl ether of an aliphatic polyol (e.g., "HELOXY Modifier 84" from Shell Chemical Co.), polyglycol diepoxide (e.g., "HELOXY Modifier 32" from Shell Chemical Co.), bisphenol F epoxides (e.g., "EPN-1138" or "GY-281" from Ciba-Geigy Corp.), 9,9-bis[4-(2,3-epoxypropoxy)-phenyl]fluorenone (e.g., "Epon 1079" from Shell Chemical Co.).

Still other useful epoxy resins contain copolymers of acrylic acid esters or glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

Other useful epoxy resins include epichlorohydrins, alkylene oxides, e.g., propylene oxide, styrene oxide; alkenyl oxides, e.g., butadiene oxide; and glycidyl esters, e.g., ethyl glycidate.

Particularly preferred epoxides are those that contain silicon, useful examples of which are described in International Patent Publication No. WO 01/51540, such as: 7-Oxabi-cyclo[4.1.0]heptane; 3,3',3'',3'''-[(2,4,6,8- tetramethylcyclotetrasiloxan-2,4,6,8-tetrayl)tetra-2,1- ethandiyl] tetrakis-; 7-Oxabi-cyclo[4.1.0] heptan, 3,3',3'',3''',3''''- [(2,4,6,8,10-pentamethylcyclo- penta-siloxan-2,4,6,8,10-pentayl)penta-2,1-ethandiyl]pentakis-, Silane; methylbis[2-(7-oxabicyclo[4.1.0]hept-3-yl)ethyl]phenyl-; Silane, dimethylbis[2-(7-oxabicyclo[4.1.0]hept-3-yl)methyl]-; Silane, dimethyl[2-(7-oxabicyclo[4.1.0]hept-3-yl)methyl][2-(7-oxabicyclo[4.1.0] hept-3-yl)ethyl]-; Silane, 1,4-phenylenbis[dimethyl[2-(7-oxabicyclo[4.1.0]hept-3-yl)ethyl]]-; Silane 1,2-ethylenbis [dimethyl[2-(7-oxabicyclo[4.1.0]hept-3-yl)ethyl]]-; Silane; dimethylbis[2-(7-oxabicyclo[4.1.0]hept-3-yl)ethyl]-; 1,3-Bis[2-(3,4-epoxycyclohexyl)ethyl]-1,1,3,3-tetramethyldisiloxane; Silane 2,5-bicyclo[2.2.1.]heptylenbis [dimethyl[2-(7-oxabicyclo[4.1.0]hept-3-yl)ethyl]]-; Silane 1,6-hexylenbis[dimethyl[2-(7-oxabicyclo[4.1.0]hept-3-yl) ethyl]]-; Silane 1,1',1''-(1,2,4- cyclohexylentris(dimethyl[2-(7-oxabicyclo[4.1.0] hept-3-yl)ethyl]))-; Trisiloxane, 3-[[dimethyl[2-(7-oxabicyclo[4.1.0]hept-3-yl)ethyl]silyl] oxy]-1,1,5,5-tetramethyl-1,5-bis[2-(7-oxabicyclo[4.1.0] hept-3-yl)ethyl]-3-phenyl-; Disiloxane 1,1',1''-(1,2,4-cyclohexanetriyltri-2,1-ethanediyl)tris[1,1,3,3-tetramethyl-3-[2-(7-oxabicyclo[4.1.0]hept-3-yl)ethyl]]-; Trisiloxane, 3,3-bis[[dimethyl[2-(7-oxabicyclo[4.1.0]hept-3-yl)ethyl]silyl] oxy]-1,1,5,5-tetramethyl-1,5-bis[2-(7-oxabicyclo[4.1.0] hept-3-yl)ethyl]-; Trisiloxane, 3-[[dimethyl[2-(7-oxabicyclo [4.1.0]hept-3-yl)ethyl]silyl]oxy]-1,1,3,5,5-pentamethyl-1,5-bis[2-(7-oxabicyclo[4.1.0]hept-3-yl)ethyl]-, 1,3,5,7-tetrakis (2,1-ethandiyl-3,4-epoxycyclohexyl)-1,3,5,7-tetramethylcyclo-tetrasiloxane and 1,3,5,7,9-pentakis(2,1-ethandiyl-3,4-epoxycyclohexyl)-1,3,5,7,9-pentamethylcyclopentasiloxane.

In addition to the epoxy resins described above, the photopolymerizable adhesive can optionally include monomers having at least one ethylenically unsaturated double bond, as described in U.S. Pat. No. 5,545,676. These monomers can make the photopolymerizable adhesive more B-stageable. Useful monomers include di- or poly-(meth)acrylates, such as methyl(meth)acrylate, ethyl acrylate, isopropyl methacrylate, n-hexyl acrylate, stearyl acrylate, allyl acrylate, glyceroldiacrylate, glycerol triacrylate, ethyleneglycol diacrylate, diethyleneglycol diacrylate, triethyleneglycol dimethacrylate,1,3-propanediol diacrylate, 1,3-propanediol dimethacrylate, trimethylolpropane triacrylate, 1,2,4-butanetrioltrimethacrylate, 1,4-cyclohexanediol diacrylate, pentaerythritol triacrylate, pentaerythritol tetraacrylate, pentaerythritoltetramethacrylate, sorbitol hexacrylate, bis[1-(2-acryloxy)]-p-ethoxyphenyl dimethylmethane,bis[1-(3-acryloxy-2-hydroxy)]-p-propoxyphenyldimethylmethane, trishydroxyethyl-isocyanurate trimethacrylate; the bis-acrylates and bis-methacrylates of polyethylene glycols of molecular weight 200-500, copolymerizable mixtures of acrylated monomers such as those of U.S. Pat. No. 4,652,274 and acrylated oligomers such as those of U.S. Pat. No. 4,642,126; unsaturated amides such as methylene bis-acrylamide, methylene bis-methacrylamide, 1,6-hexamethylenebis-acrylamide, diethylene triamine tris-acrylamide and beta-methacrylaminoethyl methacrylate; and vinyl compounds such as styrene, diallyl phthalate, divinyl succinate, divinyl adipate and divinylphthalate. Mixtures of two or more monomers can be used if desired.

Furthermore, the photopolymerizable adhesive can optionally include hydroxyl containing materials having hydroxyl functionality of at least 1, and preferably at least 2. The polyols can react with the epoxy resin and serve as a crosslinking agent as well as to speed up the curing of the photopolymerizable adhesive. Preferably the hydroxyl-containing material contains two or more primary or secondary aliphatic hydroxyl groups (i.e., the hydroxyl group is bonded directly to a non-aromatic carbon atom). The hydroxyl groups can be terminally situated, or they can be pendent from a polymer or copolymer. The molecular weight of the hydroxyl-containing organic material can vary from very low (e.g., 32) to very high (e.g., one million or more). Suitable hydroxyl-containing materials can have low molecular weights, i.e., from about 32 to 200, intermediate molecular weight, i.e. from about 200 to 10,000, or high molecular weight, i.e. above about 10,000.

The hydroxyl-containing material can optionally contain other functionalities that do not substantially interfere with cationic polymerization at room temperature. Thus, the hydroxyl-containing materials can be nonaromatic in nature or can contain aromatic functionality. The hydroxyl-containing material can optionally contain heteroatoms in the backbone of the molecule, such as nitrogen, oxygen, sulfur, and the like, provided that the ultimate hydroxyl-containing material does not substantially interfere with cationic polymerization at room temperature. The hydroxyl-containing material can, for example, be selected from naturally occurring or synthetically prepared cellulosic materials. Of course, the hydroxyl-containing material is also substantially free of groups that may be thermally or photolytically unstable; that is, the material will not decompose or liberate volatile components at temperatures below about 100° C. or in the presence of actinic light that may be encountered during the desired polymerization conditions for the photocopymerizable composition.

Representative examples of suitable hydroxyl-containing materials having a hydroxyl functionality of 1 include alkanols, monoalkyl ethers of polyoxyalkyleneglycols, monoalkyl ethers of alkylene-glycols, and others known in the art.

Representative examples of useful monomeric polyhydroxy organic materials include alkylene glycols (e.g., 1,2-ethanediol; 1,3-propanediol; 1,4-butanediol; 1,6-hexanediol; 1,8-octanediol; 2-ethyl-1,6-hexanediol; bis(hydroxymethyl)cyclohexane; 1,18-dihydroxyoctadecane; 3-chloro-1,2-propanediol); polyhydroxyalkanes (e.g., glycerine, tri-methylolethane, pentaerythritol, sorbitol) and other polyhydroxy compounds such as N,N-bis(hydroxyethyl)benzamide; 2-butyne-1,4-diol; 4,4-bis(hydroxymethyl)diphenylsulfone; castor oil; and the like.

Representative examples of useful polymeric hydroxyl-containing materials include polyoxyethylene and polyoxypropylene glycols, and particularly the polyoxyethylene and polyoxypropylene glycol diols and triols having molecular weights from about 200 to about 10,000 corresponding to a hydroxy equivalent weight of 100 to 5000 for the diols or 70 to 3300 for triols; polytetramethylene ether glycols such as polytetrahydrofuran or "poly THF" of varying molecular weight; copolymers of hydroxypropyl and hydroxyethyl acrylates and methacrylates with other free radical-polymerizable monomers such as acrylate esters, vinyl halides, or styrene; copolymers containing pendent hydroxy groups formed by hydrolysis or partial hydrolysis of vinyl acetate copolymers, polyvinylacetal resins containing pendent hydroxyl groups; modified cellulose polymers such as hydroxyethylated and hydroxypropylated cellulose; hydroxy-terminated polyesters; hydroxy-terminated polylactones, and particularly the polycaprolactones; fluorinated polyoxyethylene or polyoxypropylene glycols; and hydroxy-terminated polyalkadienes.

Useful commercially available hydroxyl-containing materials include the "TERATHANE" series of polytetramethylene ether glycols such as "TERATHANE" 650, 1000, 2000 and 2900 (available from du Pont de Nemours, Wilmington, Del.), polytetrahydrofuran with an average molecular weight of 250 (available from Sigma-Aldrich, St. Louis, Mo.), the "PEP" series of polyoxyalkylene tetrols having secondary hydroxyl groups such as "PEP" 450, 550 and 650; "BUTVAR" series of polyvinylacetal resins such as "BUTVAR" B-72A, B-73, B-76, B-90 and B-98 (available from Monsanto Chemical Company, St. Louis, Mo.); and the "FORMVAR" series of resins such as 7/70, 12/85, 7/95S, 7/95E, 15/95S and 15/95E (available from Monsanto Chemical Company); the "TONE" series of polycaprolactone polyols such as "TONE" 0200, 0210, 0230,0240, 0300 and 0301 (available from Union Carbide); "PARAPLEX U-148" aliphatic polyester diol (available from Rohm and Haas, Philadelphia, Pa.), the "MULTRON" R series of saturated polyester polyols such as "MULTRON" R-2, R-12A, R-16, R-18, R-38, R-68 and R-74 (available from Mobay Chemical Co.); "KLUCEL E" hydroxypropylated cellulose having an equivalent weight of approximately 100 (available from Hercules Inc.); "Alcohol Soluble Butyrate" cellulose acetate butyrate ester having a hydroxyl equivalent weight of approximately 400 (available from Eastman Kodak Co., Rochester, N.Y.); polyether polyols such as polypropylene glycol diol (e.g., "ARCOL PPG-425", "Arcol PPG-725", "ARCOL PPG-1025", "ARCOL PPG-2025", ARCOL PPG-3025", "ARCOL PPG-4025" from ARCO Chemical Co.); polypropylene glycol triol (e.g., "ARCOL LT-28", "ARCOL LHT-42", "ARCOL LHT 112", "ARCOL LHT 240", "ARCOL LG-56", "ARCOL LG-168", "ARCOL LG-650" from ARCO Chemical Co.); ethylene oxide capped polyoxypropylene triol or diol (e.g., "ARCOL 11-27", "ARCOL 11-34", "ARCOL E-351", "ARCOL E-452", "ARCOL E-785", "ARCOL E-786" from ARCO Chemical Co.); ethoxylated bis-phenol A; propylene oxide or ethylene oxide-based polyols (e.g., "VORANOL" polyether polyols from the Dow Chemical Co.).

The amount of hydroxyl-containing organic material optionally used in the p may vary over broad ranges, depending upon factors such as the compatibility of the hydroxyl-containing material with the resin, the equivalent weight and functionality of the hydroxyl-containing material, the physical properties desired in the final cured composition, the desired speed of photopolymerization, and the like.

Useful visible light sensitizer that forms a part of the photoinitiator system for use in the photopolymerizable adhesive should be partially or fully soluble in the cationically photopolymerizable resin described above. The sensitizer should also be free of functionalities that would substantially interfere with the cationic polymerization process, and capable of light absorption somewhere within the range of wavelengths between about 400 and about 1000 nanometers. Preferred visible light sensitizers contain one or more carbonyl functional groups.

Suitable visible light sensitizers may include compounds in the following categories: ketones, coumarin dyes (e.g., ketocoumarins), xanthene dyes, fluorone dyes, fluorescein dyes, aminoketone dyes, p-substituted aminostyryl ketone compounds and combinations thereof. Ketones (e.g., monoketones or alpha-diketones), coumarin dyes (e.g., ketocoumarins), xanthene dyes, fluorone dyes, and fluorescein dyes are particularly preferred visible light sensitizers. For applications requiring deep cure (e.g., cure of highly-filled composites), it is preferred to employ sensitizers having an extinction coefficient below about 1000 lmole$^{-1}$ cm$^{-1}$, more preferably about or below 100 lmole$^{-1}$ cm$^{-1}$, at the desired wavelength of irradiation for photopolymerization. The alpha-diketones are an example of a class of visible light sensitizers having this property, and are particularly preferred for dental applications. Deep cure can also be achieved utilizing visible light sensitizers with an extinction coefficient greater than 1000 lmole$^{-1}$ cm$^{-1}$, if the sensitizer exhibits a decreasing extinction coefficient upon exposure to light. The xanthene dyes, fluorone dyes, and fluorescein dyes are examples of a class of visible light sensitizers having this property.

By way of example, a preferred class of ketone visible light sensitizers has the formula:

ACO(X)$_b$B where X is CO or CR$^1$R$^2$ where R$^1$ and R$^2$ can be the same or different, and can be hydrogen, alkyl, alkaryl or aralkyl, b is zero, and A and B can be the same or different and can be substituted (having one or more non-interfering substituents) or unsubstituted aryl, alkyl, alkaryl, or aralkyl groups, or together A and B can form a cyclic structure which can be a substituted or unsubstituted cycloaliphatic, aromatic, heteroaromatic or fused aromatic ring.

Suitable ketones of the above formula include monoketones (b=0) such as 2,2-, 4,4- or 2,4-dihydroxybenzophenone, di-2-pyridyl ketone, di-2-furanyl ketone, di-2-thiophenyl ketone, benzoin, fluorenone, chalcone, Michler's ketone, 2-fluoro-9-fluorenone, 2-chlorothioxanthone, acetophenone, benzophenone, 1- or 2-acetonaphthone, 9-acetylanthracene, 2-, 3- or 9-acetylphenanthrene, 4-acetylbiphenyl, propiophenone, n-butyrophenone, valerophenone, 2-, 3- or 4-acetylpyridine, 3-acetylcoumarin and the like. Suitable diketones include aralkyldiketones such as anthraquinone, phenanthrenequinone, o-, m- and p-diacetylbenzene, 1,3-, 1,4-, 1,5-, 1,6-, 1,7- and 1,8-diacetylnaphthalene, 1,5-, 1,8- and 9,10-diacetylanthracene, and the like. Suitable 1-diketones (b=1 and x=CO) include 2,3-butanedione, 2,3-pentanedione, 2,3-hexanedione, 3,4-hexanedione, 2,3-heptanedione, 3,4-heptanedione, 2,3-octanedione, 4,5-octanedione, benzil, 2,2'-3 3'- and 4,4'-dihydroxylbenzil, furil, di-3,3'-indolylethanedione, 2,3-bornanedione (camphorquinone), biacetyl, 1,2-cyclohexanedione, 1,2-naphthaquinone, acenaphthaquinone, 1-phenyl-1,2-propanedione, and the like.

Examples of particularly preferred visible light sensitizers include the alpha-diketones: camphorquinone; glyoxal; biacetyl; 3,3,6,6-tetramethylcyclohexanedione; 3,3,7,7-tetramethyl-1,2-cycloheptanedione; 3,3,8,8-tetramethyl-1,2-cyclooctanedione; 3,3,18,18-tetramethyl-1,2-cyclooctadecanedione; dipivaloyl; benzil; furil; hydroxybenzil; 2,3-butanedione; 2,3-pentanedione; 2,3-hexanedione; 3,4-hexanedione; 2,3-heptanedione; 3,4-heptanedione; 2,3-octanedione; 4,5-octanedione; 1,2-cyclohexanedione; and 1-phenyl-1,2-propanedione. Of these, camphorquinone is the most preferred visible light sensitizer.

Examples of preferred fluorone dyes include, but are not limited to, fluorescein, 4'5'-dibromofluorescein, erythrosin B, ethyl eosin, eosin Y, and erythrosin, yellowish blend.

Another component in the photoinitiator system is an anthracene-based electron donor compound or a combination of such compounds. A variety of anthracene-based compounds can be employed in the photoinitiator systems and generally are capable of increasing the speed of polymerization and/or the depth of polymerization of a composition comprising a cationically polymerizable resin when exposed to visible light of the desired wavelength, as compared to the same composition but excluding the anthracene-based electron donor compound.

More specifically, anthracene-based electron donor compounds conforming to the structure I shown below may be employed.

In the above structure I, the substituents R$_1$ to R$_{10}$ may be any group that does not have a substantially adverse effect on cationic polymerization, and are independently selected from H, alkyl groups, aryl groups and/or alkoxy groups, preferably C$_1$-C$_{10}$ alkyl and/or C$_1$-C$_{10}$ alkoxy. The most preferred R-group substituents are methyl, ethyl, propyl, butyl, tert-butyl, methoxy, and ethoxy Particularly useful anthracene-based compounds include: 2-ethyl-9,10-dimethoxyanthracene (EDMOA), 9,10-dimethylanthracene, 9,10-diethoxyanthracene, 1,4-dimethoxyanthracene, 9-methylanthracene, 2-ethylanthracene, 2-tert-butylanthracene, 2,6-di-tert-butylanthracene, 9,10-diphenyl-2,6-di-tert-butylanthracene, and combinations thereof. All of these compounds with the exception of the 2,6-di-tert-butylanthracene derivatives are available from Sigma-Aldrich, St. Louis, Mo.

In one embodiment, the photoinitiator system comprises a combination of two or more anthracene-based compounds. The mixture may include unsubstituted anthracene (i.e. R$_{1-10}$ are all H), or another anthracene that has a light absorption maximum less than about 400 nanometers, in combination with a substituted anthracene of structure I, preferably an alkyl or alkoxy substituted anthracene, such as EDMOA, 2,6-di-tert-butylanthracene or 9,10-dimethylanthracene. Alternatively, the system may comprise two or more substituted anthracenes.

Alternatively, many of the preferred anthracene-based compounds disclosed herein exhibit improved performance even when used in the absence of any additional anthracene-based compounds. In particular, alkoxy substituted anthracenes such as 2-ethyl-9,10-dimethoxyanthracene (EDMOA), 9,10-diethoxyanthracene, and 1,4-dimethoxyanthracene when used as the sole electron donor have been shown to possess superior cure speed and/or cure depth compared to previously reported anthracenes. Accordingly, the photoinitiator system may comprise EDMOA, 9,10-diethoxyanthracene, or 1,4-dimethoxyanthracene, either alone or in combination with one or more additional substituted anthracenes, or with unsubstituted anthracene.

The anthracene-based compounds preferably possess one or more (and more preferably several if not all) of the following properties: (a) they are soluble or partially soluble in the polymerizable composition; (b) they do not absorb a significant amount of light at the wavelength of the light used to photopolymerize the composition, typically the wavelength at which the visible light sensitizer exhibits maximum absorption, by which it is meant that the electron donor compound does not detrimentally affect the performance of the visible light sensitizer; (c) they have an oxidation potential ($E_{ox}$) greater than 0 but less than that of 1,4-dimethoxybenzene when measured versus a saturated calomel electrode (SCE); (d) a $pk_b$ greater than about 8; (e) they impart not more than a minimal amount of objectionable color to the photopolymerized resin; and (f) they cause no more than a minimal amount of polymerization inhibition. Other factors that may influence the selection of the anthracene-based compound for a particular composition include the cationically polymerizable resin, the iodonium salt, and the visible light sensitizer that have been chosen, as well as the shelf stability of the cationically polymerizable composition.

While preferred anthracene-based compounds have an $E_{ox}$ greater than zero and less than or equal to that of 1,4-dimethoxybenzene, it is more preferred that the electron donor compound have an $E_{ox}$ that is less than about 1.35 volts when measured using a saturated calomel electrode (SCE), and even more preferred that the $E_{ox}$ be between about 0.5 and 1.34 volts (vs. a SCE). $E_{ox}$ values can be measured experimentally, or obtained from established reference sources, such as N. L. Weinburg, Ed., *Technique of Electroorganic Synthesis Part II Techniques of Chemistry*, Vol. V (1975), and C. K. Mann and K. K. Barnes, *Electrochemical Reactions in Nonaqueous Systems* (1970).

Advantageously, the anthracene-based electron donor compound may accelerate the rate of polymerization (as measured by gel time) of the cationically polymerizable resin, as compared to compositions without the electron donor compound. For many uses of the photopolymerizable compositions, the gel time is preferably less than 60 minutes, more preferably less than about 10 minutes, and most preferably less than about 2 minutes as established according to the gel time protocol as reported in U.S. Pat. No. 6,765,036 (Dede et al.). Briefly, the electron donor compound and comparative compounds were evaluated for their effect on the polymerization speed in a particular cationically polymerizable composition by combining the cationically polymerizable resin with the desired visible light sensitizer, iodonium salt, and electron donor compound, and mixing until homogeneous. Each sample was examined for gel time by transferring the photopolymerizable composition to a 6-mm diameter×2.5-mm thick Teflon mold with a polyester film clamped in direct contact with the bottom face. The sample was placed directly beneath the light guide of a VISILUX 2 or ELIPAR Trilight (utilizing the standard light intensity mode for the latter) dental curing light at a distance of 10 mm. Samples were irradiated up to a maximum of 120 seconds and hard gel times were established by probing the surface with a plastic probe until a hard, tack free surface was observed.

The individual components of the photoinitiator system are provided in photopolymerizingly effective amounts (i.e., amounts effective to yield a photoinitiator system that can initiate photopolymerization of the cationically polymerizable resin or, more preferably, that can accelerate the rate of polymerization). Preferably, the visible light sensitizer is present at about 0.05-5.0 weight percent based on the overall photopolymerizable composition, more preferably, at about 0.10-2.0 weight percent. The iodonium salt is preferably present at about 0.05-10.0 weight percent, more preferably at about 0.10-5.0 weight percent, and most preferably at about 0.50-3.0 weight percent, based on the overall composition. The electron donor compound or compounds (i.e. anthracenes) are preferably present at about 0.01-5.0 weight percent, more preferably about 0.05-1.0 weight percent, and most preferably about 0.05-0.50 weight percent, based on the overall composition.

The photopolymerizable adhesives are prepared by simply admixing the components under "safe light" conditions. Suitable inert solvents may be employed if desired when effecting this mixture. Any solvent may be used so long as it does not react appreciably with the components of the ahesive. Examples of suitable solvents include acetone, dichloromethane, acetonitrile and lactones. A liquid material to be polymerized may be used as a solvent for another liquid or solid material to be polymerized. Solventless compositions can be prepared by simply dissolving the iodonium complex salt, sensitizer, and electron donor in the cationically polymerizable resin, with or without the use of mild heating to facilitate dissolution.

EXAMPLES

Example 1

Formation of Abrasive Particles

Into a 1-liter container was charged 25 grams of eutectic tin-bismuth gray colored powder having an average diameter of 20 to 25 micrometers (from Indium Corp. of America, Utica, N.Y.), 100 grams of 0.5 mm zirconia grinding media (from Tosoh Corp., Tokyo, Japan), and 0.25 gram of polycrystalline diamond (from UK Abrasives, Northbrook, Ill.). This mixture was milled for 24 hours at 100 revolutions per minute where the diamond deposited in and on the tin-bismuth powder. The gray tin-bismuth alloy changed to a nearly black color of the polycrystalline diamond after the milling, evidencing that the polycrystalline diamond has attached to largely the entire circumference of the tin-bismuth alloy.

After the milling, the mixture was passed through a 40 micrometer sieving screen to separate the diamond laden tin-bismuth particles (the abrasive particles) from the grinding media.

Formation of a Fixed Abrasive Article

A 25×25 inch sheet of polyester terephthalate (PET) attached to a similar sized aluminum substrate was wiped with a paper tissue soaked with a solution of 1 part epoxy resin and 50 parts methyl ethyl ketone (MEK) so that the PET became slightly hazed with the epoxy/MEK solution.

The abrasive particles made above were then poured onto the hazed PET. The abrasive particles were then spread onto the hazed PET by tilting and tapping it to spread and thereby create a nearly monolayer of the particles attached to the hazed PET. A 25×25 inch sheet of Scotchpak® 1022 release liner (from 3M Company, St. Paul, Minn.) covered the substantially monolayer of abrasive particles. A rubber roller was then used to compress any stray particles that may have been stacking on other particles into the hazed PET to yield an abrasive article.

A photopolymerizable adhesive was made by charging into a vessel in the absence of visible light, 5 grams polytetrahydrofuran (from Aldrich, Milwaukee, Wis.), 94 grams 3,4-epoxycyclohexulmethyl-3,4-epoxycylcohexene caboxylate (from, Michigan), 1 gram 4-methylphenyl-4-isopropyliphenyliodnium, sold as RHODORSIL 2074 (Bluestar Silicones, Rock Hill, S.C.), 0.2 gram camphorquinone (from Aldrich), and 0.2 gram 1,4-dimethoxy anthracene (from Aldrich). The mixture was stirred at room temperature for 30 minutes.

In the absence of visible light, the photopolymerizable adhesive made above was applied to a first surface of a first rigid substrate, a planar anodized aluminum platen, using a rubber roller such that the photopolymerizable adhesive completely covered the platen. Slightly excess photopolymerizable adhesive was used to allow for better compensation of the varying thicknesses in the abrasive articles and in the photopolymerizable adhesive. A 20×20 inch square of the fixed abrasive article made above was applied, particle size up, to the platen coated with the photopolymerizable adhesive. The fixed abrasive article was stroked using a rubber roller to remove any trapped air bubbles. A clean, flat sheet of 20×20 inch window glass was placed on top of the abrasive particles to yield a stack which was allowed to equilibrate for 10 minutes. Thereafter, a bank of 4×500 watts halogen lamps were directed at the glass and the power to the lamps was switched on for 10 minutes to polymerize and thereby vitrify the adhesive. The lamps were then turned off and the stack cooled to room temperature. The adhesive appeared to be polymerized after 1 hour.

What is claimed is:

1. An abrasive particle comprising (i) a substantially spheroid metal containing matrix having a circumference; and (ii) a super abrasive material having an average diameter of less than 8 micrometer embedded only in the circumference of the metal containing matrix and in the subsurface of the metal containing matrix near the circumference, wherein the abrasive particle has an average diameter of less than about 200 micrometer.

2. The abrasive particle of claim 1, wherein the super abrasive material has an average diameter of about 0.2 to 0.3 micrometer, and wherein the particle has an average diameter of less than about 50 micrometer.

3. The abrasive particle of claim 1, wherein the metal containing matrix is selected from the group consisting of tin, tin alloy, copper, copper alloy, indium, indium alloy, and eutectic tin-bismuth alloy.

4. The particle of claim 1, wherein the super abrasive material is selected from the group consisting of diamond, polycrystalline diamond, cubic boron nitride, and combinations thereof.

5. The particle of claim 1 further comprising super abrasive material is disposed in a subsurface of the substantially spheroid metal containing matrix.

6. A fixed abrasive article comprising:
a backing having opposing first and second surfaces;
an adhesive disposed on at least one of the first and second surfaces of the backing; and
a plurality of abrasive particles disposed on the adhesive, each particle comprising (i) a substantially spheroid metal containing matrix having a circumference, and (ii) a super abrasive material having an average diameter of less than about 8 micrometer embedded only in the circumference of the metal containing matrix and in the subsurface of the metal containing matrix near the circumference, wherein the abrasive particle has an average diameter of less than about 200 micrometer.

7. The fixed abrasive article of claim 6, wherein the abrasive particles are substantially in a monolayer arrangement with a gap between some of the particles or the abrasive particles are stacked on top of one another.

8. The fixed abrasive article of claim 6, wherein the second surface of the backing does not contain abrasive particles and the fixed abrasive article further comprises a rigid substrate attached to the second surface of the backing with a photopolymerizable adhesive.

9. The fixed abrasive article of claim 8 being substantially flat such that there is less than about 2 micrometer difference in height across a 16 inch sample of the article.

10. The fixed abrasive article of claim 8, wherein the backing transmits visible light and the photopolymerizable adhesive is cured using visible light having a wavelength of about 400 to 1000 nanometers.

11. The fixed abrasive article of claim 6, wherein the super abrasive material has an average diameter of about 0.2 to 0.3 micrometer, and wherein the particle has an average diameter of less than about 50 micrometer.

12. The fixed abrasive article of claim 6, wherein the metal containing matrix is selected from the group consisting of tin, tin alloy, copper, copper alloy, indium, indium alloy, and eutectic tin-bismuth alloy.

13. The fixed abrasive article of claim 6, wherein the super abrasive material is selected from the group consisting of diamond, polycrystalline diamond, cubic boron nitride, and combinations thereof.

14. A method of making a fixed abrasive article comprising the steps of:
providing a backing having opposing first and second surfaces;
applying an adhesive to the first surface of the backing; and
depositing a plurality of abrasive particles disposed on the adhesive coated first surface of the backing, each particle comprising (i) a substantially spheroid metal containing matrix having a circumference, and (ii) a super abrasive material having an average diameter of less than about 8 micrometer embedded only in the circumference of the metal containing matrix and in the subsurface of the metal containing matrix near the circumference, wherein the abrasive particle has an average diameter of less than about 200 micrometer.

15. The method of claim 14, further comprising the steps of:
providing a substantially flat first rigid substrate having opposing first and second surface;
applying a photopolymerizable adhesive on the first surface of the rigid substrate;
contacting the second surface of the backing containing the fixed abrasive particles to the first surface of the rigid substrate containing the photopolymerizable adhesive to form a stack;
covering the fixed abrasive particles with a substantially flat second rigid substrate forcing the photopolymerizable adhesive to move into alignment thereby compensating for thickness variance within the abrasive article; and
exposing the stack to visible light to vitrify the photopolymerizable adhesive yielding a vitrified adhesive that bonds the backing of the fixed abrasive article to the first rigid substrate.

16. The method of claim 15, wherein the at least one of the first rigid substrate, second rigid substrate, and backing transmits visible light and the photopolymerizable adhesive is cured using visible light having a wavelength of about 400 to 1000 nanometers.

17. The method of claim 14, wherein the abrasive particles are substantially in a monolayer arrangement with a gap between some of the particles or the abrasive particles are stacked on top of one another.

18. The method of claim 14, wherein the super abrasive material has an average diameter of 0.2 to 0.3 micrometer, and wherein the abrasive particle has an average diameter of less than about 50 micrometer.

19. The method of claim 14, wherein the metal containing matrix is selected from the group consisting of tin, tin alloy, copper, copper alloy, indium, indium alloy, and eutectic tin-bismuth alloy.

20. The method of claim 14, wherein the super abrasive material is selected from the group consisting of diamond, polycrystalline diamond, cubic boron nitride, and combinations thereof.

* * * * *